US011893109B2

(12) United States Patent
Pientka et al.

(10) Patent No.: US 11,893,109 B2
(45) Date of Patent: Feb. 6, 2024

(54) PROTECTION AND RECOVERY OF BACKUP STORAGE SYSTEMS FROM RANSOMWARE ATTACKS

(71) Applicant: Exagrid Systems, Inc., Marlborough, MA (US)

(72) Inventors: Alex Pientka, Marlborough, MA (US); Michael Carleton, Marlborough, MA (US); Adrian T. VanderSpek, Worcester, MA (US); Stephen Smith, Marlborough, MA (US); Luke Makosky, Marlborough, MA (US); Peter Watkins, Newton Center, MA (US); Nathaniel W. Turner, Providence, RI (US); Sandra C. Scott, Marlborough, MA (US); Yee-Ching Chao, Nashua, NH (US); Thomas J. Gillispie, Acton, MA (US); William Andrews, Reading, MA (US); David G. Therrien, Nashua, NH (US); Jamey C. Poirier, Grafton, MA (US); Mark B. Hecker, Northborough, MA (US); Andrew H. French, Lexington, MA (US)

(73) Assignee: Exagrid Systems, Inc., Marlborough, MA (US)

( * ) Notice: Subject to any disclaimer, the term of this patent is extended or adjusted under 35 U.S.C. 154(b) by 395 days.

(21) Appl. No.: 17/149,880

(22) Filed: Jan. 15, 2021

(65) Prior Publication Data

US 2021/0224379 A1 Jul. 22, 2021

Related U.S. Application Data

(60) Provisional application No. 62/963,894, filed on Jan. 21, 2020.

(51) Int. Cl.
*G06F 21/50* (2013.01)
*G06F 21/54* (2013.01)
(Continued)

(52) U.S. Cl.
CPC .......... *G06F 21/54* (2013.01); *G06F 11/1435* (2013.01); *G06F 11/1464* (2013.01);
(Continued)

(58) Field of Classification Search
CPC ..................................................... G06F 21/54
See application file for complete search history.

(56) References Cited

U.S. PATENT DOCUMENTS

2011/0016095 A1* 1/2011 Anglin ................ G06F 11/1453
711/216
2011/0022801 A1* 1/2011 Flynn .................... G06F 11/108
711/120
(Continued)

OTHER PUBLICATIONS

Extended European Search Report, dated Jun. 14, 2021, Application No. 21151846.9.

*Primary Examiner* — Ponnoreay Pich
(74) *Attorney, Agent, or Firm* — Mintz, Levin, Cohn, Ferris, Glovsky and Popeo, P.C.

(57) ABSTRACT

A method, a system, and a computer program product for protection and recovery of backup storage systems from ransomware attacks. A request to modify data stored in a storage system is received. The storage system includes at least one component configured to store the deduplicated data. An acknowledgement of the received request is generated. The acknowledgement indicates that the data stored in the at least one component and identified in the received request was modified. Modification of the data stored in the at least one component and identified in the received request for a predetermined period of time is prevented.

27 Claims, 9 Drawing Sheets

(51) Int. Cl.
*G06F 11/14* (2006.01)
*G06F 21/55* (2013.01)
*G06F 21/56* (2013.01)
*G06F 21/78* (2013.01)

(52) U.S. Cl.
CPC .......... *G06F 21/554* (2013.01); *G06F 21/568* (2013.01); *G06F 21/78* (2013.01)

(56) References Cited

U.S. PATENT DOCUMENTS

| | | | |
|---|---|---|---|
| 2012/0317359 A1* | 12/2012 | Lillibridge | G06F 12/00 711/E12.001 |
| 2014/0006357 A1* | 1/2014 | Davis | G06F 3/067 707/667 |
| 2016/0291891 A1* | 10/2016 | Cheriton | G06F 3/064 |
| 2018/0018458 A1* | 1/2018 | Schmugar | G06F 21/554 |
| 2018/0075239 A1* | 3/2018 | Boutnaru | G06F 21/60 |
| 2019/0108341 A1* | 4/2019 | Bedhapudi | G06F 16/1752 |
| 2021/0224379 A1* | 7/2021 | Pientka | G06F 21/568 |

* cited by examiner

| Attack target | Mode of Attack | Protection and Recovery Operation |
|---|---|---|
| Backup Storage | Delete via NFS/CIFS – some and/or all landing zone references to backup sets have been deleted (See, e.g., FIG. 3) | • Deferred deletion defers delete requests for an admin specified period<br>• Backup Storage system is placed in hold mode during recovery<br>• With some configurations, NAS shares cannot be scanned<br>• Active Directory credentials for CIFS access |
| Backup Client | Data Encryption (See, e.g., FIG. 4) | • Purge backup of encrypted client data via backup application<br>• Restore any/all clients from pre-ransomware attack backup storage image |
| Backup Storage | Encrypt via NFS/CIFS – some and/or all of landing zone data has been encrypted (See, e.g., FIG. 5) | • When this data is deduplicated, it will create new anchors and deltas in the repository that will be purged via the backup application as part of the ransomware recovery process<br>• The encryption sequence causes a file read, encrypt, write sequence and replaces the original file with an encrypted version. Protection and recovery operations may be individually investigated and addressed (e.g., through manual deletion, automatic deletion, quarantining, etc.) |
| Backup Server | Reduce Retention Policy – cause deletion at backup storage (See, e.g., FIG. 6) | • Deferred deletion defers delete requests for an admin specified period<br>• Backup Storage system is placed in hold mode during recovery |

PROTECTION AND RECOVERY OF BACKUP STORAGE SYSTEMS FROM RANSOMWARE ATTACKS

CROSS-REFERENCE TO RELATED APPLICATIONS

The present application claims priority to U.S. Provisional Patent Appl. No. 62/963,894 to Pientka et al., filed Jan. 21, 2020, and entitled "Protection and Recovery of Backup Storage Systems from Ransomware Attacks", and incorporates its disclosure herein by reference in its entirety.

TECHNICAL FIELD

The present application generally relates to data processing, and in particular to backup storage systems, and more particularly, to protection and recovery of backup storage systems from ransomware attacks.

BACKGROUND

Backup data sets maintained by backup application software and backup storage systems represent one of the main recovery sources of data when primary storage systems are attacked by ransomware. In addition, a possibility of a successful recovery of affected primary storage systems is greatly diminished or even made impossible when such backup storage systems that maintain recovery data are attacked by ransomware.

Ransomware attacks typically involve mass deletion and/or mass modification (e.g., encryption) of primary data and/or backup data. In some cases, for scaled-out backup storage systems, it is often difficult/impossible to distinguish between a legitimate delete/modify request from a legitimate backup software application and a similar delete/modify requests from a ransomware attacker application. Improvements in the protection and recovery of ransomware attacks on backup storage systems is critical. Thus, a recovery mechanism is needed that allows the backup system to maintain pre-ransomware-affected backup data to backup application software in order to enable it to restore primary storage/client data. In addition, protection and recovery from ransomware attacks of the backup data maintained in backup storage systems is crucial.

SUMMARY

In some implementations, the current subject matter relates to a computer-implemented method for protection and recovery of backup storage systems from ransomware attacks. The method may include receiving a request to modify data stored in a storage system, the storage system including at least one component configured to store the deduplicated data; generating an acknowledgement of the received request, the acknowledgement indicating that the data stored in the at least one component and identified in the received request was modified; and preventing modification of the data stored in the at least one component and identified in the received request for a predetermined period of time.

In some implementations, the current subject matter can include one or more of the following optional features. As stated above, the component may be a repository configured to store immutable deduplicated data. Further, the storage system, as is also discussed above, may include at least one cache storage component communicatively coupled to the component (e.g., repository) and configured to store backup data received by the storage system. The modification may include at least one of the following: deletion of the requested data, encryption of the requested data, modification of the requested data, and any combinations thereof.

In some implementations, the method may include deleting, upon expiration of the predetermined period of time, the requested data from the repository component. The method may also include receiving, prior to expiration of the predetermined period of time, a notification indicating that the received request to modify data is a malicious request to modify data, and executing at least one of the following: preventing storage of the modified requested data in the repository component, and deleting data, modified as a result of the received request, from the repository component, preventing deletion of the requested data from the repository component, and any combination thereof.

In some implementations, the repository component may be configured to store a copy of unmodified data, identified in the received request, and the modified data, as modified by the received request. Further, the method may further include maintaining a queue of a plurality of requests to modify data stored in the repository component. The maintained queue may be organized based on respective predetermined time periods associated with each request in the plurality of requests.

In some implementations, the method may further include storing metadata identifying data stored in the repository component. In some implementations, the predetermined period of time may be configurable. A modification of the predetermined period of time may be prohibited.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2b illustrates an exemplary chart summarizing some modes of attacks, attack targets and protection and recovery operations;

DETAILED DESCRIPTION

Figure 1:
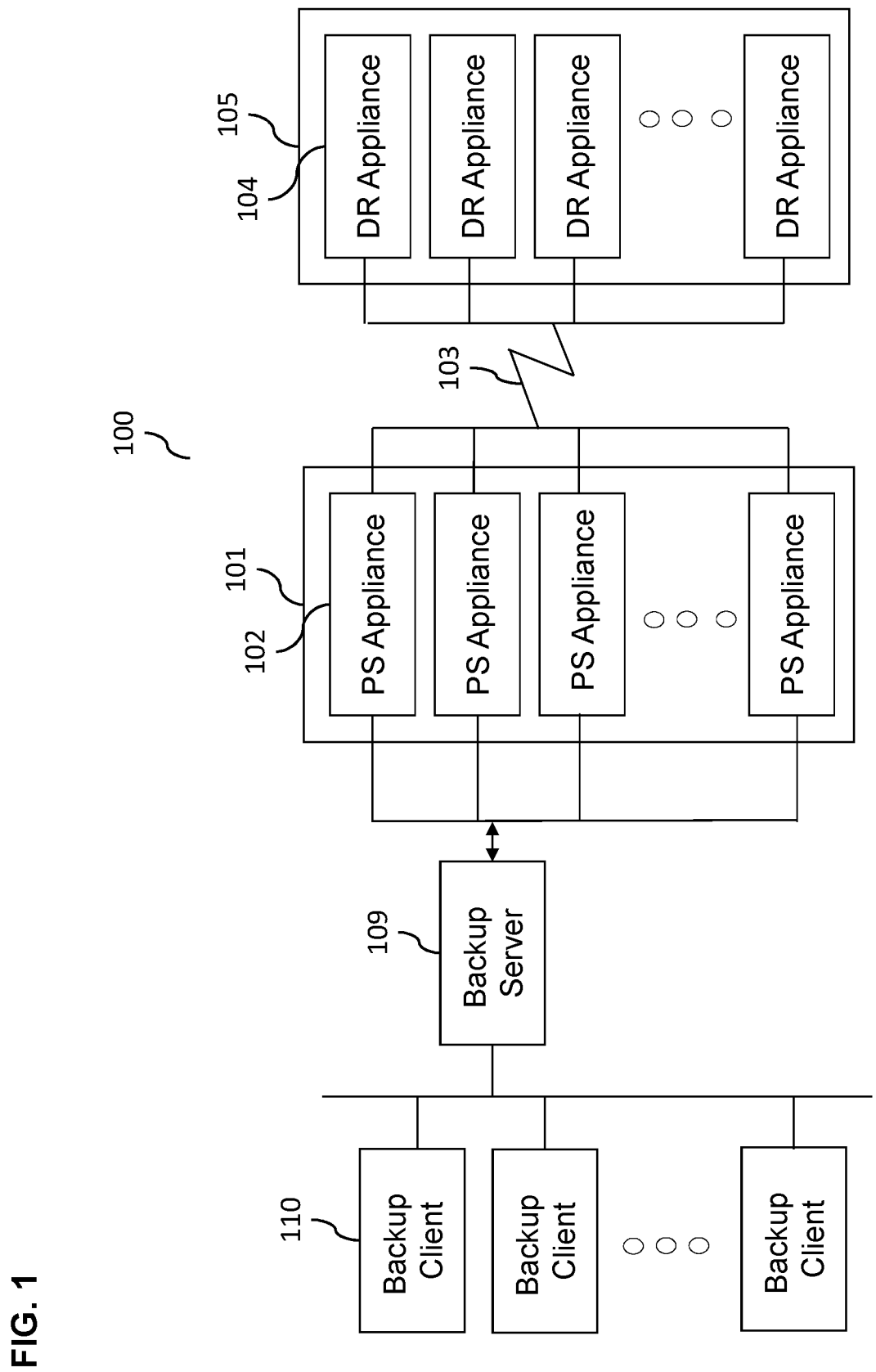
FIG. 1 illustrates an exemplary backup and disaster recovery environment, according to some implementations of the current subject matter.

In some implementations, the current subject matter may be configured to protect and/or recover backup data that may be stored in both a primary storage site and a disaster recovery storage site of one or more scale-out backup storage systems from ransomware attacks and/or any other attacks that may be designed to otherwise compromise data stored in such systems.

A scale-out backup storage system may be a storage architecture (e.g., a network-attached storage (NAS) architecture), where a total amount of disk space may be expanded by adding one or more devices, such as through use of connected arrays having their own resources. In scale-out systems, new hardware devices may be added and configured, in accordance with necessity and/or as desired. Upon reaching a storage capacity limit of the current deployment of a scale-out backup storage system, on or more devices and/or one or more arrays of devices may be added to expand the system's capacity. In some cases, scale-out storage systems can harness the added storage capacity across devices/arrays and/or use added devices to increase network storage capacity, thereby improving/adding performance and/or addressing the need for additional storage capacity.

One or more sites of the backup storage system may be configured to include one or more appliances (e.g., storage devices, servers, memory components, processors, networking, etc., and/or any combination thereof). Each appliance of the scale-out backup storage system may be configured to include one or more functional data storage areas and/or locations. In some implementations, such storage areas may include a landing zone area/location and a repository. One or more backup applications may be configured to send data that they collect from one or more backup clients into the landing zone area/location of the one or more appliances. The backup data that is received into the landing zone area may be deduplicated, compressed and then transmitted to the repository area of the appliance for storage. The repository may be configured to store an independent backup of the backup data stored in the landing zone. New, updated, renamed, and/or deleted backup files sent by the backup application to the landing zone may be logged, deduplicated, and/or stored as immutable objects in the repository area (e.g., the objects may remain immutable within the backup retention window). This means that backup applications may be prevented from directly accessing the backup data stored in the repository. In some implementations, change and/or deletion requests of immutable objects stored in the repository may be deferred for a predetermined deferred deletion period. Such deletion deferral may allow data that may be impacted by various delete and/or modify requests, such as, for example, as a result of being subject of a ransomware attack on the landing zone area, may be recoverable to a pre-attack point-in-time using the immutable repository data.

The deferred deletion period may be configured, for example, using a deferred deletion policy that may be set by information technology (IT) administrators. The deferred deletion policy may include a deferred deletion period that may exceeds the time that it takes for IT administrators to detect and/or respond to a ransomware attack and/or any other attack within their IT environment. For example, it may typically take IT administrations one to four weeks for a response (although any period of time may be preset) to a ransomware attack. In some implementations, the current subject matter may be configured to delay all deletion requests from a legitimate backup server and/or a ransomware attack for a predetermined period of time (e.g., deferred deletion time period), as will be discussed below.

In some implementations, some of the advantages of the current subject matter may include one or more of the following:
- the current subject matter does not require management of magnetic tapes for an air-gap (which may result in high CAPEX and/or OPEX);
- the current subject matter does not require a second copy of data to be stored to an object store system and/or cloud service (which may again result in high CAPEX and/or OPEX);
- the current subject matter may protect data from a ransomware attack at one or both the primary storage site and/or any other storage site (e.g., disaster recovery site);
- execution/results of processes by the current subject matter may typically consume approximately 2% (and/or less) more storage capacity per week of extended deferred deletion protection;
- the current subject matter may be configured to create one or more complete sets of immutable backup data (and/or store them in separate locations) to provide for an increased resilience to a ransomware attack;
- all normal local deduplication and/or remote site replication operations may be configured to continue operating in the same manner without being affected by implementation of the deferred deletion period/function (e.g., there is no change to recovery time objective (RTO) and recovery point objective (RPO) parameters of second storage site's disaster recovery data);
- the current subject matter may be configured to allow elimination of any ransomware-affected backup data that was received into the backup storage system as part of a recovery operation by deleting specific backup images using the backup application software.

FIG. 1 illustrates an exemplary backup and disaster recovery environment 100, according to some implementations of the current subject matter. The system 100 may be configured to include one or more backup clients 110, one or more backup servers 109, a scale-out backup storage site or system 101 (e.g., deployed at a primary storage site), and another scale-out backup storage site or system 105 (e.g., deployed at a secondary or a disaster recovery storage site).

The primary storage site 101 may include one or more primary site (PS) appliances 102. Similarly, the secondary storage site 105 may include one or more secondary or disaster recovery (DR) appliances 104. The sites 101 and 105 may be communicatively coupled using a network 103. The network 103 may be configured to include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components 101-102, 104-105 and/or 109-110 in the environment 100 may include any combination of hardware and/or software. In some implementations, the components 101-102, 104-105 and/or 109-110 may be disposed on one or more computing devices, such as, server(s), database(s), personal computer(s), laptop(s), cellular telephone(s), smartphone(s), tablet computer(s), and/or any other computing devices and/or any combination thereof. In some implementations, the components 101-102, 104-105 and/or 109-110 may be disposed on a single computing device and/or may be part of one or more communications networks. Alternatively, one or more components 101-102, 104-105 and/or 109-110 may be separately located from one another.

In some implementations, the backup server 109 may be configured to collect data from one or more backup client systems 110 (e.g., system 110 may be configured to transmit backup data to the server 109 via any of the above networks). Such collection may be performed on a periodic basis (e.g., hourly, daily, weekly, etc.) and/or as desired. All data collected from client system 110 may be configured to be securely stored at the scale-out backup storage system 101, using one or more appliances 102. To further protect received backup data (e.g., and prevent it from loss due to accidents, disaster, etc.), the scale-out backup storage system 105, that may be disposed at another location (e.g., outside of a disaster distance from the primary site) may be used and may be configured to receive a copy of the backup data from the system 101 via the network connection 103.

As shown in FIG. 1, within the primary and second site systems 101, 105, one or more primary site appliances 102 and disaster recovery appliances 104 may be deployed at each respective system 101, 105. Each primary system's backup storage appliance 102 may be configured to maintain data for a subset of one or more backup software primary storage/client 110 data sets that may be received by the system 101. For each primary storage/client data set, a backup policy/job may be defined/executed (e.g., a backup administrator may define how, when, etc. data backup processes are executed) within/by the backup application software at the system 101. Each backup policy/job may be configured to be characterized by a predetermined data retention period. For example, the retention period may be set based on regulatory and/or other business requirements to maintain historical versions of data for a predetermined period of time (e.g., N days, weeks, months, years, etc.). The backup storage systems 101, 105 may be configured to execute data retention management by maintaining data copies in their respective repositories until they are requested to be deleted (e.g., by a backup application).

Figure 2A:
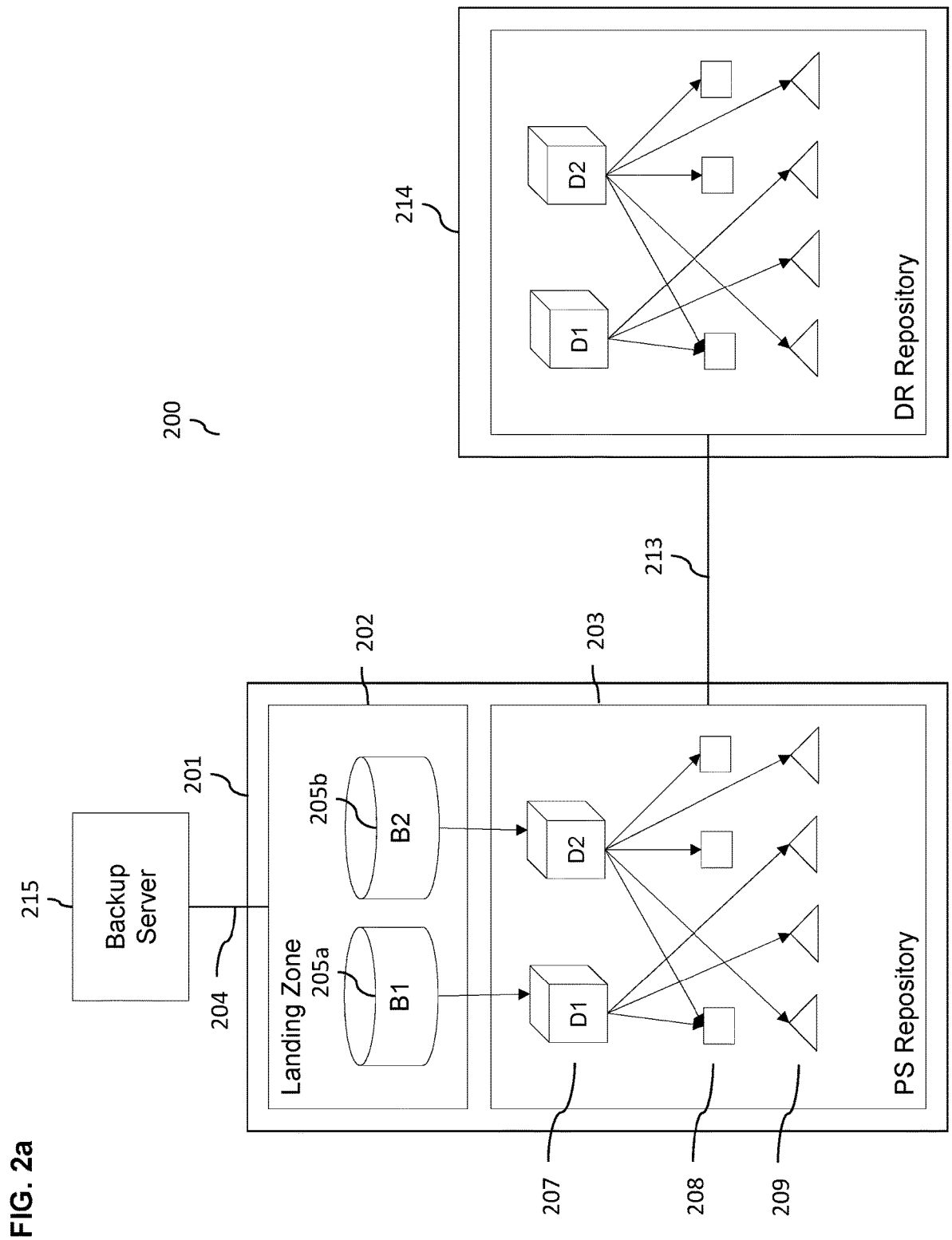
FIG. 2a illustrates an exemplary backup and disaster recovery environment, according to some implementations of the current subject matter.

FIG. 2a illustrates an exemplary backup and disaster recovery environment 200, according to some implementations of the current subject matter. FIG. 2a illustrates additional details of the system 100, and in particular, storage of two backup data sets (B1, B2). The environment 200 may include a backup server 215, a primary storage system appliance 201 and a secondary storage system appliance 214 that may be communicatively coupled to the primary storage system appliance 201 using a network connection 213. The backup server 215 may be communicatively coupled to the system appliance 201 using a network connection 204. Similar to FIG. 1, the network connections 204, 213 may be configured to include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof. As can be understood, the environment 200 is not limited to the two systems appliances 201 and 214, and there may be additional storage system appliance (e.g., primary and/or secondary), as shown in FIG. 1.

The primary system appliance 201 may be configured to include a landing zone 202 and a repository 203. The landing zone 202 may be configured to temporarily store and/or cache the most recent collection of backup data that it may receive from the backup server 215. Moreover, the landing zone 202 may be configured to temporarily store "rehydrated" data (e.g., undeduplicated, decompressed, etc.) that it receives from the repository 203, whereby the data may be rehydrated or restored upon an extraction/restore request that may be received to extract/restore stored deduplicated, compressed (e.g., delta-compressed, data-compressed, etc.) data from the repository 203 (and/or any other repository). The repository 203 may be configured to store backup data that has been processed (e.g., deduplicated, delta-compressed, data-compressed, etc.) for a substantially longer period of time than in the landing zone 202 (e.g., and/or permanently). The landing zone 202 and the repository 203 may be communicatively coupled using various connections (e.g., shared disk volume, wired, wireless, etc.). The landing zone 202 and/or the repository 203 may correspond to any type of non-volatile storage, non-volatile flash memory, hard disk drive, ROM, PROM, EPROM, EEPROM, DRAM, fast CPU cache memory, SRAM, etc., and any combinations thereof.

As shown in FIG. 2a, backup data sets B1, B2 205 are received from the backup server 215 via the network connection 204 and may be configured to be stored in the landing zone 202 of the primary site appliance 201. The data sets B1, B2 may be deduplicated and then stored, as deduplicated data, in the repository 203 as immutable objects. The deduplicated data sets may also be replicated to the secondary system appliance 214 and stored in its repository as immutable objects. As can be understood, the systems appliances 201 and 214 may be similar to the respective systems appliances shown in FIG. 1. In some exemplary, non-limiting implementations, the landing zone 202 and the repository 203 may be configured to consume about 50% each of an appliance's available data storage capacity; however, other capacity allocations may be possible such as to increase/decrease landing zone capacity and/or repository capacity.

Referring back to FIG. 2a, backup data sets B1, B2 205 (e.g., new, modified, etc.) may be transmitted and written to the landing zone 202 by the backup server 215 as part of a periodic backup operation (and/or any other type of backup operation). In some implementations, all and/or some new and/or modified backup data, e.g., sets B1, B2 205, that is received in the landing zone 202 may be scheduled to be deduplicated to generate corresponding deduplicated data sets D1, D2 207 and stored in the repository 203 of the disk storage system of the backup appliance 201. The deduplicated data sets D1, D2 207 may be further stored as a collection of anchor versions or anchors 208 and/or containers of delta-compressed zones or versions/containers of delta-compressed versions 209. An anchor version of data may be any version of backup data (e.g., delta-compressed, data-compressed, uncompressed, etc.) that may include one or more versions that are dependent on it (alternatively, or in addition to, no versions of data may be dependent on an anchor), whereby dependency may be determined using one or more content differences between the anchor version of data and another version of data. A discussion of anchor versions may be found in co-owned U.S. Pat. No. 10,498, 356 to Hecker et al., issued Dec. 3, 2019, and entitled "Systems and Methods for Version Chain Clustering", and U.S. Pat. No. 10,114,831 to VanderSpek et al., issued Oct. 30, 2018, and entitled "Delta Version Clustering and Re-Anchoring", the disclosures of which are incorporated herein by reference in their entireties.

In some implementations, the anchors 208 and delta-compressed versions/containers of delta-compressed versions 209 may represent one or more deduplicated zones of the original backup data sets B1, B2 and may be stored/retained in accordance with each backup application's backup and/or backup job-specific retention policy (e.g., days, weeks, months, years, etc.). Upon expiration of the retention period, the associated anchors 208 and/or delta-compressed versions/containers of delta-compressed versions 209 that may be stored within one or more storage containers of the repository 203 may be deleted from the backup storage system 201. Once stored in the repository 203, the data may become immutable and cannot be deleted until expiration of the backup retention period. Once the retention period has expired, one or more anchors 208 and/or delta-compressed versions/containers of delta-compressed versions 209 to which this period is applicable may be deleted. In some implementations, the anchors 208 and/or delta-compressed versions/containers of delta-compressed versions 209 may be replicated to the secondary system appliance 214 (as shown in FIG. 2a), which may have its own data retention period that may or may not be different from the data retention period of the appliance 201.

In today's world, stored data may frequently be subject of a malware attack, a ransomware attack, and/or any other attack. Ransomware attacks may invoke deletion and/or modification operations (e.g., encryption, zero out file, change file type, overwrite file metadata/headers, permute bytes, etc.) on backup data contained in one or more attack targets. Such attacks compromise integrity of data, cause loss of data, etc. FIG. 2b (along with FIGS. 3-6) illustrates an exemplary chart 230 summarizing some modes of ransomware attacks, attack targets and protection and recovery operations. For example, the ransomware attack may attack a backup storage, a backup client, a backup server, and/or any other location.

As shown in chart 230, one of the attacks may be configured to attack a backup storage system 201. The mode of attack may include deletion via network file system/common internet file system (NFS/CIFS), whereby some and/or all data (e.g., backup data, metadata, reference(s) to backup set(s), flat file(s), database(s), etc.) contained in the landing zone is deleted. The protection/recovery operation may include execution of deferred deletion that may defer any and/or all delete requests for a specified period (e.g., that may be set by an IT administrator). Further, backup storage system may be placed in a hold mode during recovery (e.g., no further backup data may be accepted by the system), scanning for NAS shares may be suspended, and/or active directory credentials may be required for CIFS access, etc.

Figure 3:
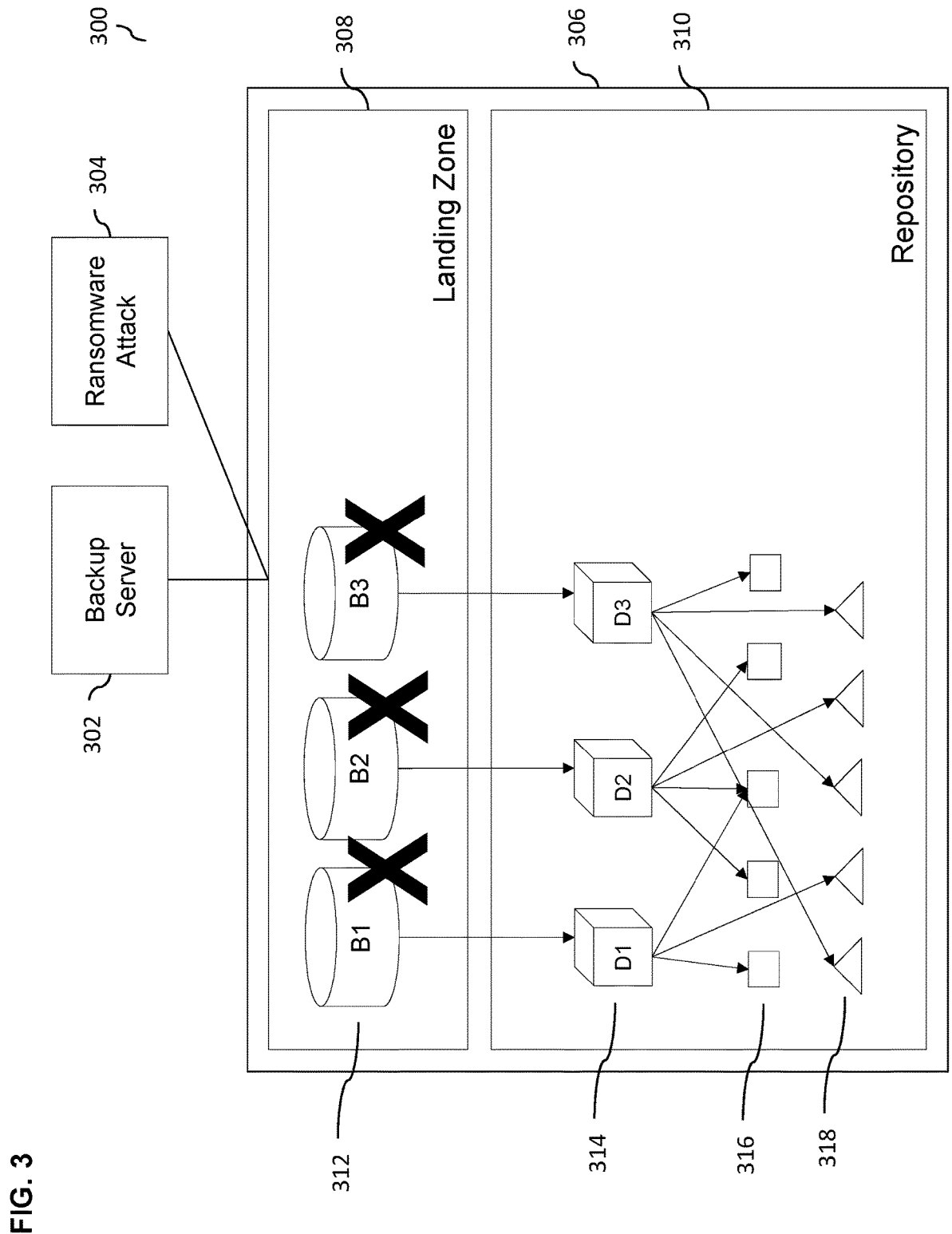
FIG. 3 illustrates details of a ransomware attack on a backup storage system, whereby attack deletes all of the backup images in the landing zone, according to some implementations of the current subject matter.

FIG. 3 illustrates details of a ransomware attack on a system 300, whereby the attack is designed to delete some and/or all of the backup images contained/stored in the landing zone.

As shown in FIG. 3, the system 300 may include a backup server 302 and a backup storage appliance 306 having a landing zone 308 and repository 310. The system 300 may be similar to the systems 100, 200 shown in FIGS. 1 and 2a, respectively. The backup server 302 may be configured to transmit one or more backup data sets B1, B2, B3 312 into the landing zone 308. The data sets B1, B2, B3 may be deduplicated for immutable protection in the repository 310 as deduplicated data sets D1, D2, D3 314. The deduplicated data sets D1-D3 314 may be further stored as collection(s) of one or more anchor versions or anchors 316 and/or one or delta-compressed versions/containers of delta-compressed versions 318. Deduplicated data sets D1, D2, and D3 may be immutable from deletion/update for the duration of the entire backup retention period.

As shown in FIG. 3, a ransomware attack 304 (e.g., a malicious software program, code, etc.) may be attempting to delete some and/or all data from the appliance 306. In some cases, in the scale-out backup storage system, it may be difficult or even impossible to disambiguate between a legitimate backup application's 302 request to delete backup data versus a request to delete data sent by the ransomware attack 304.

In some implementations, for protection against such ransomware attacks and recovery purposes, the current subject matter may be configured to provide a deferred deletion policy that may be enforced by each backup appliance 306 within a scale-out backup storage system (e.g., such as system 100 shown in FIG. 1). The deferred deletion policy may be stored as a computing code and/or any other computing component in the system 300 and its execution may be triggered by a receipt of the backup data (and/or as a result of any other action). Using this policy, all delete requests of backup retention data (e.g., D1, D2, D3 314) from the repository 310 within each appliance 306 may be deferred or delayed for a predetermined deferred deletion period of time (e.g., N hours, days, weeks, months, etc.). Any modification of this policy, including creation and/or any other changes, may require an authorization of two or more IT administrators in order to provide for increased operational security. In some exemplary implementations, the predetermined deferred deletion period of time may be determined using time(s) that may be needed by the backup administrator(s) to detect and/or respond to a ransomware attack. In some cases, the deferred deletion policy may impose a slight increase in overall backup appliance storage capacity consumption (e.g., approximately 2% (or less) more storage per week of deferred deletion retention).

As shown in FIG. 3, it is assumed that the ransomware attack 304 was successful at issuing delete requests to all and/or some of the backup data sets 312 (as shown by "X" marks in FIG. 3). In a worst case scenario, all backup data sets 312 were successfully deleted from the landing zone 308 by the ransomware attack 304. The ransomware attack software 304 may receive confirmation (e.g., through operation of its software code, for example) that all delete requests/deletions appear to have been successful.

However, while deletions of the backup data sets 312 from the landing zone 308 may have been successfully achieved, the associated deduplicated data sets 314, as represented by the collection of anchors 316 and delta-compressed versions/containers of delta-compressed versions 318 may remain unaffected by the deletion of the data sets B1-B3 312. This is because in accordance with the deferred deletion policy, the repository data sets D1-D3 314 are not actually deleted for the duration of the predetermined deferred deletion period of time. As soon as presence of the ransomware attack 304 is alerted to, triggered, etc. (e.g., made known to the IT administrators), each backup storage appliance 306 may be switched from a backup mode state (whereby more data may be accepted for backed into the appliance) into a recovery mode state (whereby data is not being accepted for backup). Such a switch may be automatic (e.g., via an appropriate computing code, function, etc.) and/or manual (e.g., using backup storage system's administrator console). In the recovery mode state, all changes to the backup data sets and deduplication data may be prevented/not permitted. The recovery mode state may be independent of and/or last during the entirety of the predetermined deferred deletion period of time and/or beyond. Until expiration of the predetermined deferred deletion period of time, repository data sets 314 will be prevented from being deleted.

Upon placing the backup system 300 into the recovery mode state, backup client data may be restored from the repository data sets 314 to the landing zone 308 through one or more restore operations that may be executing on the backup server 302. The system 300 may be configured to determine (e.g., automatically, by its IT administrator, etc.) a pre-attack point-in-time and issue appropriate restore request operations using the backup application running on the backup server 302.

Figure 4:
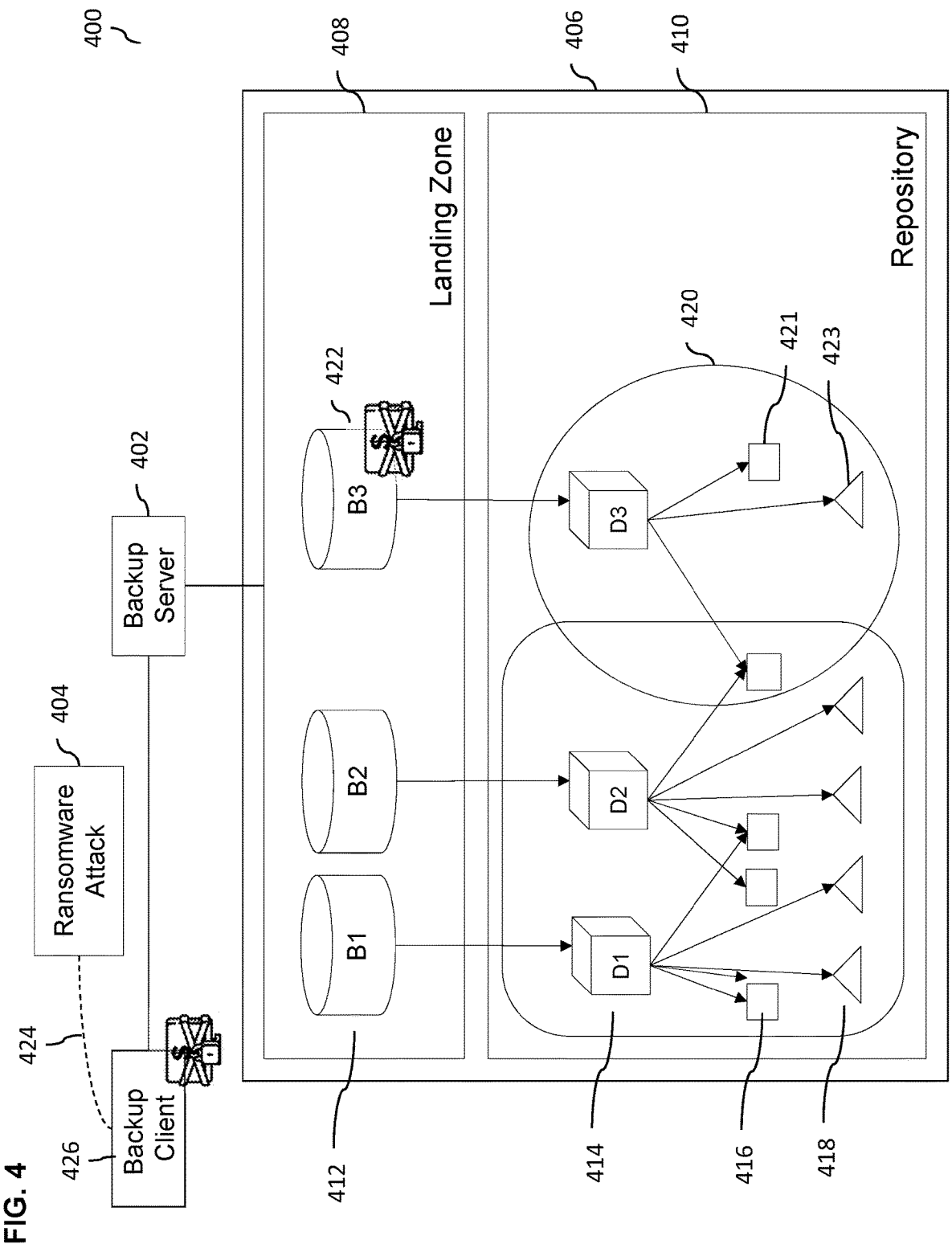
FIG. 4 illustrates details of a ransomware attack encrypting data at the backup client, according to some implementations of the current subject matter.

Referring back to FIG. 2b, one of the attacks may be configured to attack a backup client 426 (as shown in FIG. 4) by performing data encryption. In this case, for protection/recovery, the backup of encrypted backup client data may be sent to the backup storage system 406 via backup application running on the backup server 402. Moreover, restoration of any and/or all backup client's data from pre-ransomware attack backup storage image may be performed. FIG. 4 illustrates details of a ransomware attack on a system 400, whereby the attack attempts to perform data encryption on the backup client 426.

The system 400 may include a backup server 402 and a backup storage appliance 406 having a landing zone 408 and a repository 410. The system 400 may be similar to the systems 100, 200 shown in FIGS. 1 and 2a, respectively. The backup server 402 may be configured to transmit one or more backup data sets B1, B2, 412 into the landing zone 408. The data sets B1, B2 may be deduplicated for storage in the repository 410 as deduplicated data sets D1, D2 414. The deduplicated data sets D1-D2 414 may be further stored as collection(s) of one or more anchor versions or anchors 416 and/or one or more delta-compressed versions/containers of delta-compressed versions 418. Deduplicated data sets D1, D2 may be immutable from deletion/update during the entire backup retention period.

FIG. 4 illustrates a behavior of the backup storage appliance 406 when a request to modify/encrypt one or more backup clients' 426 files has been issued as part of a ransomware attack 404. As shown in FIG. 4, this particular ransomware attack 404 may be focused on modification/encryption of primary storage backup client data (e.g., one of the data sets B1-B2). The ransomware attack 404 may be initiated by modifying/encrypting data 424 on one or more backup clients 426. In the event the ransomware attack 404 successfully encrypts data on one or more backup clients 426, the next periodically scheduled backup operation running on the backup server 402 may generate a fully and/or partially ransomware encrypted backup data set B3 422 in the landing zone 408. Deduplication of the encrypted backup data set B3 422 may further generate a collection 420 that includes, deduplicated data set D3 along with corresponding new anchors 421 and delta-compressed versions/containers of delta-compressed versions 423 stored in the repository 410. This process may even link these new anchors/delta-compressed versions/containers of delta-compressed versions to existing anchors/delta-compressed versions/containers of delta-compressed versions from prior backup data sets.

In some implementations, the landing zone 408 may be configured to act as a cache of the most recent backup data files received from the backup application. The landing zone 408 may also maintain various metadata that may describe all of the backup data files stored during the backup application's specified retention period. Any request for a backup file that is not currently being stored (e.g., resident) in the landing zone 408 (e.g., aged-out) may be reassembled from the landing zone's 408 metadata and the anchors 416 and delta-compressed versions/containers of delta-compressed versions 418 that are stored in the repository 410. Thus, all of the backup data files that have been retained for a long period of time (e.g., months to years) as determined based on the backup application's retention period may be available for either reading or deletion, but not modification, overwriting, encryption, etc. For example, as shown in FIG. 4, deduplicated data set D3 may be encrypted by the ransomware attack and/or may be stored in the repository. In some exemplary implementations, the "clean-up" (e.g., deletion, flagging, etc.) of the encrypted data set D3 may also be performed.

In an investigation that may follow a ransomware attack, the system 400 (e.g., its backup administrator) may be alerted to the date/time of when the attack occurred and may be configured to restore data to the affected backup clients 426 from the backup data sets 412 that were generated/created prior to the date/time of the ransomware attack 404. Further, through the backup application that runs on the backup server 402, any modified/encrypted backup data sets 422 may be deleted, at which point, the associated repository anchors 421 and delta-compressed versions/containers of delta-compressed versions 423 may be marked for deletion. In some exemplary, non-limiting implementations, such deletion of modified/encrypted data may be performed manually.

Figure 5:
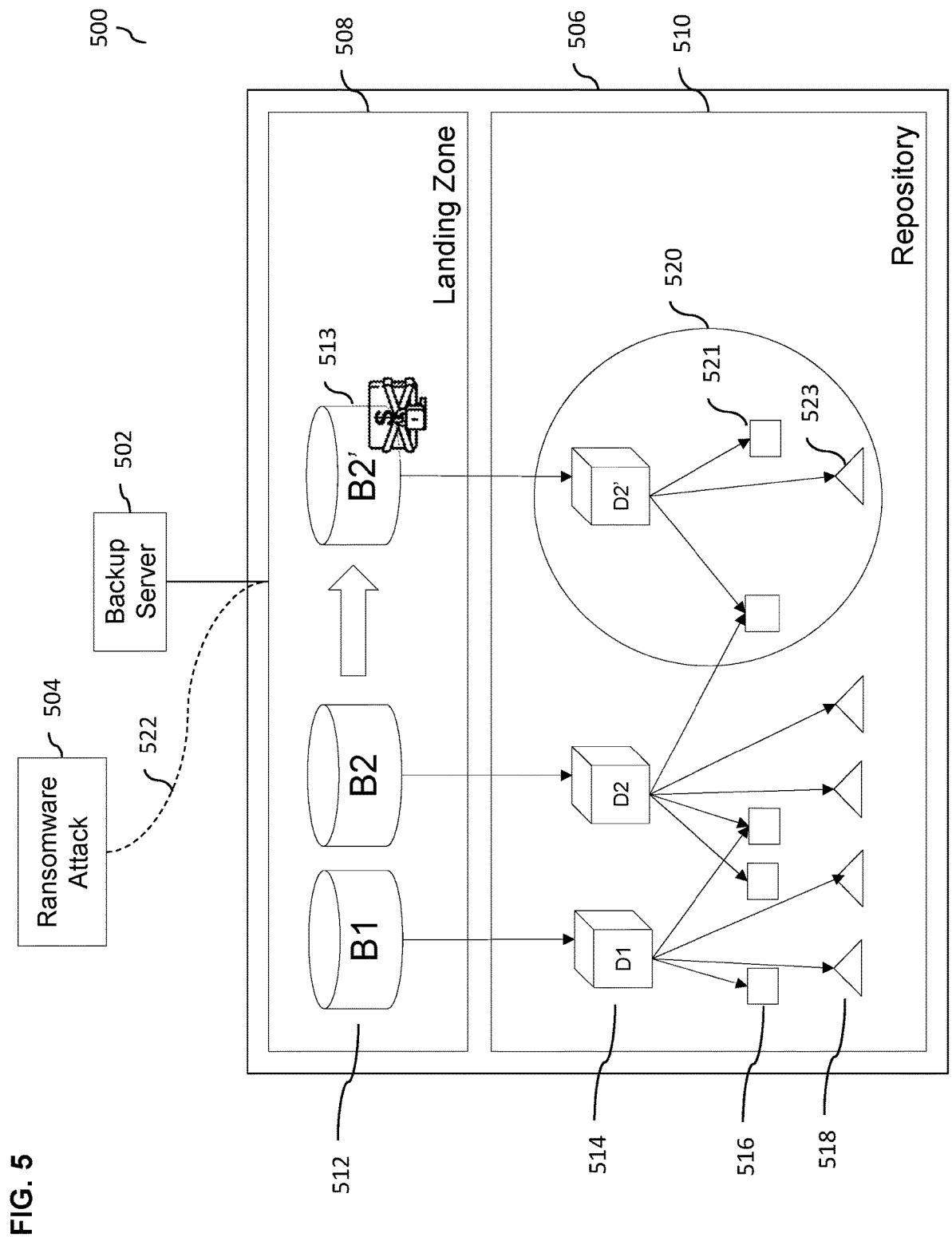
FIG. 5 illustrates details of a ransomware attack encrypting data on a backup storage appliance via NFS/CIFS, according to some implementations of the current subject matter.

Referring back again to FIG. 2b, another target of a ransomware attack may be backup storage and its mode of attack may be encryption, via NFS/CIFS, of some and/or all of landing zone data. Recovery and protection procedures may include purging of data as well as deferral of deletion. For example, when encrypted data is deduplicated, it will create new anchors and delta-compressed versions/containers of delta-compressed versions in the repository. The encryption sequence may cause a file read, encrypt, write sequence and replace the original file in the landing zone with an encrypted version. It should be noted that the original un-encrypted data and/or corresponding encrypted data (and/or any other encrypted data) may have been stored (e.g., as immutable data as part of deduplication/compression protection operations). Protection and/or recovery operations may involve manual investigation of affected data and taking appropriate actions (e.g., manual deletion, automatic deletion, quarantining affected data, etc.). FIG. 5 illustrates details of the above ransomware attack on a system 500, whereby the attack attempts to perform data encryption.

Similar to FIGS. 3-4, the system 500 may include a backup server 502 and a backup storage appliance 506 having a landing zone 508 and a repository 510. The backup server 502 may be configured to transmit one or more backup data sets B1, B2 512 into the landing zone 508. The data sets B1, B2 may be deduplicated for storage in the repository 510 as deduplicated data sets D1, D2 514. The deduplicated data sets D1-D2 514 may be further stored as collection(s) of one or more anchor versions or anchors 516 and/or one or more delta-compressed versions/containers of delta-compressed versions 518.

As shown in FIG. 5, a ransomware attack 504 may access one or more backup data sets 512 directly on the backup storage appliance 506. Using NFS/CIFS NAS remote file access protocols 522, ransomware attack 504 may access any and/or all of the backup data files 512 that are being retained in the backup appliance 506 in the landing zone. In this example, all of the data files in the backup data set B2 may be read, modified and/or encrypted and/or rewritten to the landing zone 508 to generate a new encrypted backup data set B2' 513. When the encrypted backup data set B2' 513 is deduplicated into a deduplicated data set D2' 520. As a result, new anchors 521 and delta-compressed versions/containers of delta-compressed versions 523 may be generated for storage in the repository 510. These new anchors 521 and delta-compressed versions/containers of delta-compressed versions 523 may also be linked to existing anchors 513 and delta-compressed versions/containers of delta-compressed versions 518 from backup data sets that were created prior to the ransomware attack 504. Any restore operation that is requested after a ransomware attack may be configured to leverage data sets D1 and D2 to properly recover pre-ransomware attack backup data. Backup data set D2' corresponding to the post-ransomware-attack data set may be purged from the repository 510.

In some implementations, the current subject matter may be configured to include a timing feature (e.g., a function, a code, a trigger mechanism, etc.), which may be triggered upon receipt of a request to delete any and/or some data stored in the storage system (e.g., systems shown in FIGS. 3-6 and discussed herein). Such timing feature may be configured to cause initiation of predetermined deferred deletion period, whereby, for the duration of which, no deletion of data may be permitted, and, upon expiration of the predetermined deferred deletion period, data deletion requests may be allowed to proceed (e.g., by deleting data) and/or alternatively, or in addition to, any other actions may be executed (e.g., further alerts may be generated, etc.).

Moreover, upon receipt of a request to delete data, the current subject matter may be configured to generate an acknowledgement indicating that request to delete data was received and acted upon. This may create an impression on the requestor (e.g., a ransomware attacker) that deletion request has succeeded. However, in view of the deferred deletion policy, the current subject matter may be configured to actually prevent deletion of data until the predetermined deferred deletion period has expired.

Figure 6:
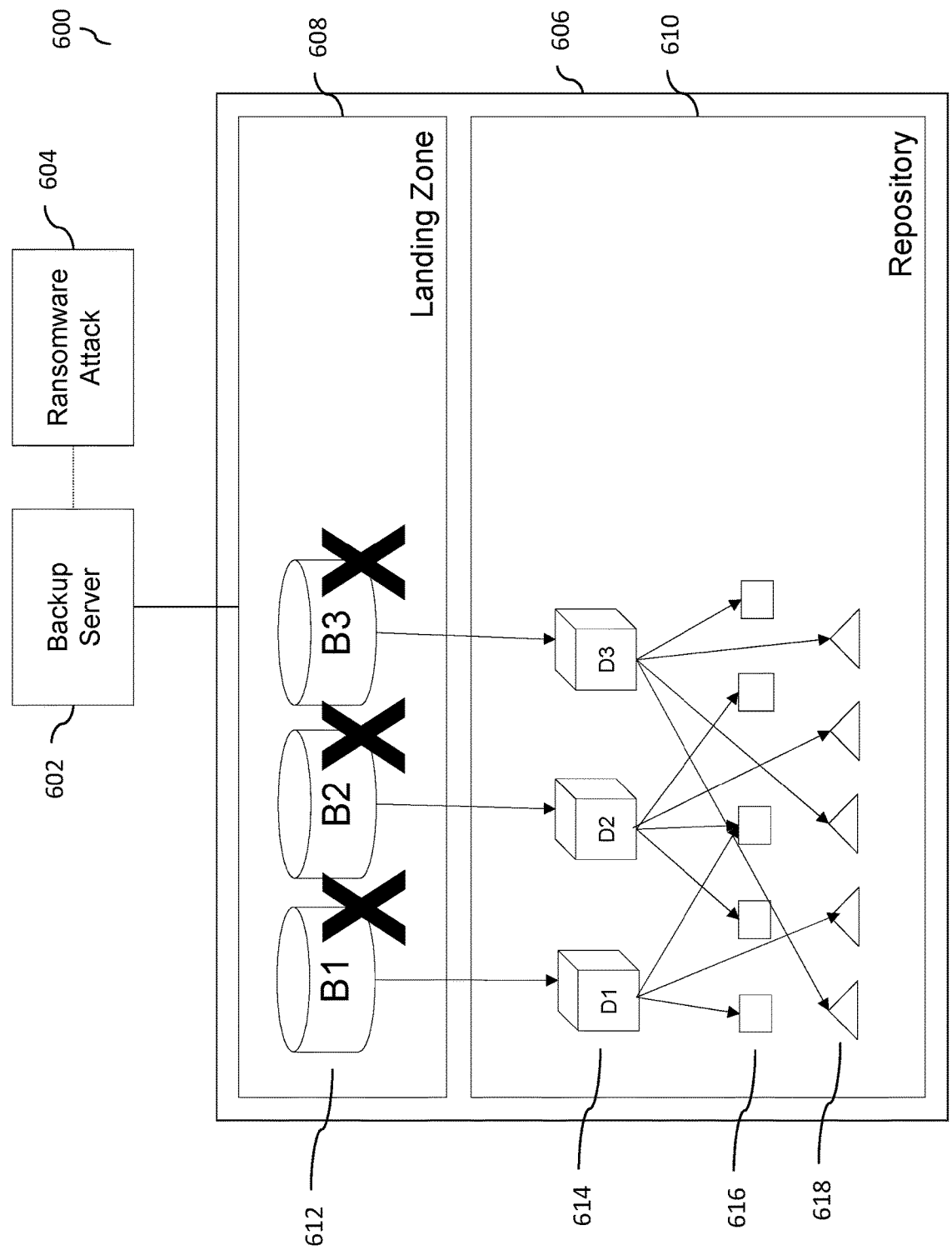
FIG. 6 illustrates details of a ransomware attack on a backup server, according to some implementations of the current subject matter.

As shown in FIG. 2b, a ransomware attack may attack a backup server by reducing one or more backup job retention policies, thereby causing deletion operations on the backup storage system. However, with deferred deletion policy in place, such delete requests may be deferred for a predetermined deferred deletion period of time (as for example, may be specified by an IT administrator). Further, backup storage system may be placed into a hold mode during recovery of data. FIG. 6 illustrates details of the above ransomware attack on a backup storage system 600. Similar to FIGS. 3-5, the system 600 may also include a backup server 602 and a storage appliance 606 having a landing zone 608 and a repository 610. The backup server 602 may be configured to transmit one or more backup data sets B1, B2, B3 612 into the landing zone 608. The data sets B1, B2, B3 may be deduplicated for storage in the repository 610 as deduplicated data sets D1, D2, D3 614 and may be further stored as collection(s) of anchors 616 and/or one or more delta-compressed versions/containers of delta-compressed versions 618.

As stated above, FIG. 6 illustrates another form of ransomware attack 604 where backup job retention policies on the backup server 600 are modified. In particular, by altering the retention policy of one or more backup policies to maintain either a shorter retention period or even set the retention policy to zero days, the attack 604 may cause the backup server to issue backup file delete requests to one or more backup data sets 612. However, by each backup storage system employing a deferred deletion policy, all repository delete requests may be deferred for the predetermined deferred deletion period of time, thereby protecting the backup repository 610 from losing critical recovery versions of backup data.

In some implementations, the current subject matter system may be configured to implement various security, authentication protocols, etc. (e.g., use of multiple security keys, two-factor authentication protocols, etc.) to prevent accidental and/or purposeful modifications to/deletions of data stored in the repository even during predetermined deferred deletion period of time and/or alteration of the duration of the predetermined deferred deletion period. For example, such protocols may be useful in the event an IT administrator unilaterally and/or maliciously issues delete requests for deletion of data stored in the repository and/or shorten the predetermined deferred deletion period of time. Upon receipt of such request, the current subject matter storage system may execute the security/authentication protocol and require the IT administrator to obtain an appropriate authorization (e.g., a valid authentication key, a two-factor authentication, etc.). Such authorization may be from another individual and/or third party computing system (e.g., a trusted source). This will ensure that there are no undesirable changes to the data stored in the repository.

Figure 7:
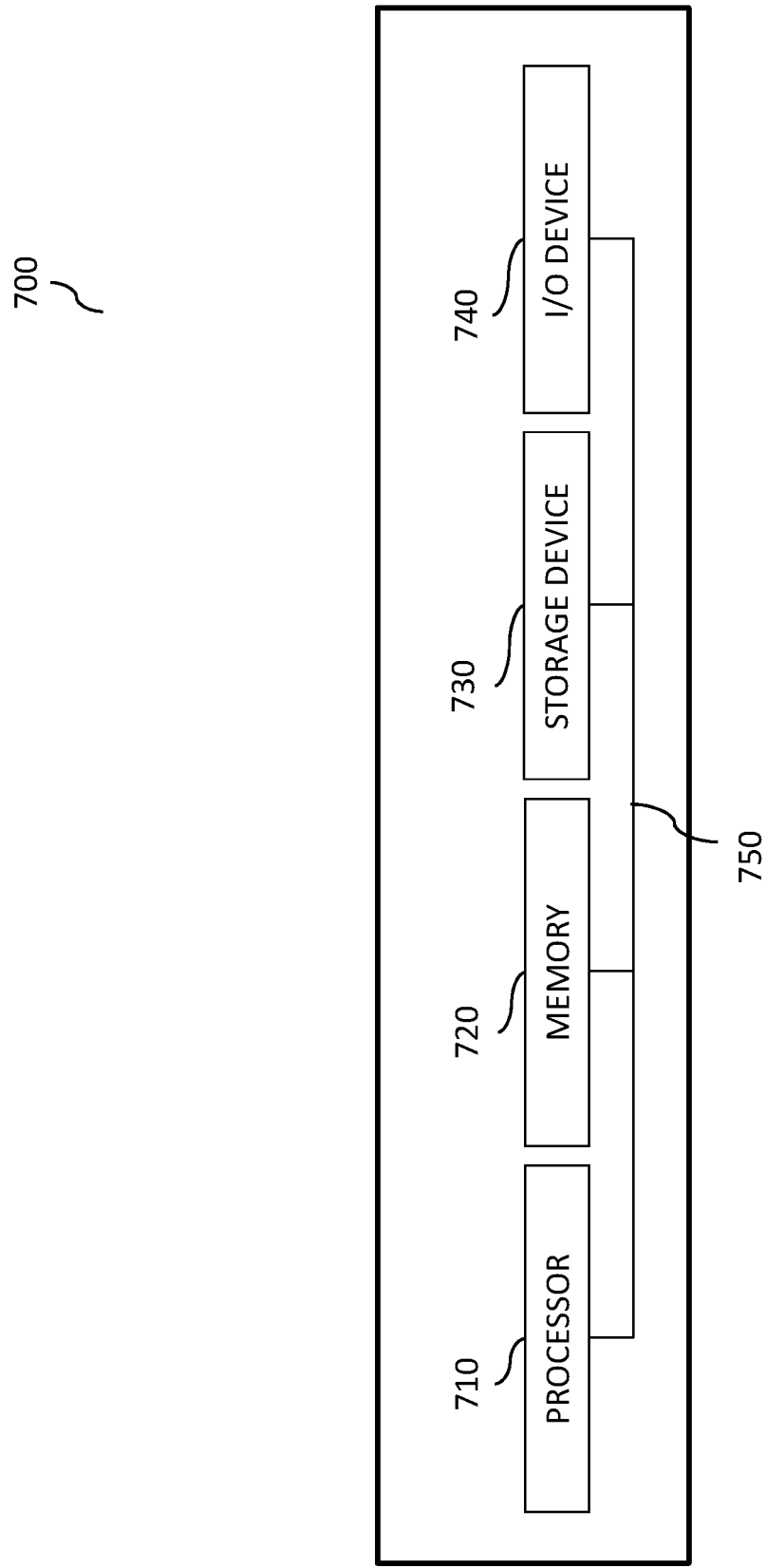
FIG. 7 illustrates an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory

720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
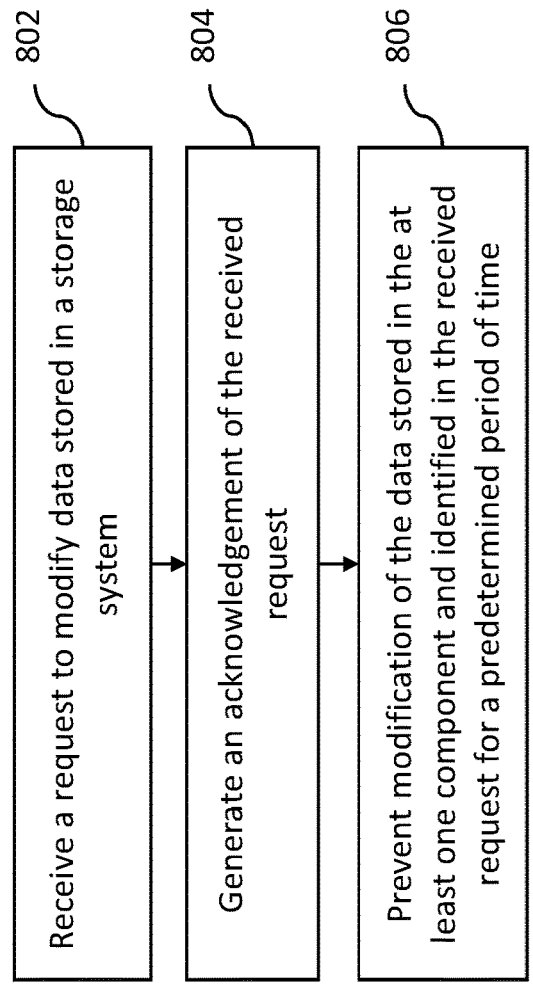
FIG. 8 illustrates an exemplary method, according to some implementations of the current subject matter.

FIG. 8 illustrates an exemplary process 800, according to some implementations of the current subject matter. At 802, a request to modify data stored in a storage system may be received. The storage system may be configured to include at least one component (e.g., a repository component, as shown in FIGS. 2*a*, 3-6). Such repository component may be configured to store deduplicated data. This component (e.g., a repository) may be communicatively coupled to another component (e.g., a landing zone) that may be configured to receive, cache/store, deduplicate/undeduplicated, process, etc. backup data.

At 804, an acknowledgement of the received request may be generated. The acknowledgement may be configured to indicate that the data stored in this component (e.g., repository) and identified in the received request was modified. In some implementations, the data may actually be modified and/or stored together with the unmodified original data. Such modified/unmodified data sets may be stored in one or more of the landing zone and/or the repository. Moreover, the data stored in the landing zone may be deleted, modified, encrypted, etc. as a result of the received request.

At 806, modification of the data stored in this component and identified in the received request may be delayed and/or prevented for a predetermined period of time (e.g., predetermined deferred deletion period of time, as discussed above).

In some implementations, the current subject matter can include one or more of the following optional features. As stated above, the component may be a repository configured to store immutable deduplicated data. Further, the storage system, as is also discussed above, may include at least one cache storage component communicatively coupled to the component (e.g., repository) and configured to store backup data received by the storage system. The modification may include at least one of the following: deletion of the requested data, encryption of the requested data, modification of the requested data, and any combinations thereof.

In some implementations, the method may include deleting, upon expiration of the predetermined period of time, the requested data from the repository component. The method may also include receiving, prior to expiration of the predetermined period of time, a notification indicating that the received request to modify data is a malicious request to modify data, and executing at least one of the following: preventing storage of the modified requested data in the repository component, and deleting data, modified as a result of the received request, from the repository component, preventing deletion of the requested data from the repository component, and any combination thereof.

In some implementations, the repository component may be configured to store a copy of unmodified data, identified in the received request, and the modified data, as modified by the received request. Further, the method may further include maintaining a queue of a plurality of requests to modify data stored in the repository component. The maintained queue may be organized based on respective predetermined time periods associated with each request in the plurality of requests.

In some implementations, the method may further include storing metadata identifying data stored in the repository component. In some implementations, the predetermined period of time may be configurable. A modification of the predetermined period of time may be prohibited.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising receiving a request to modify data stored in a storage system, the storage system including a repository configured to store a deduplicated data and at least one cache storage component communicatively coupled to the repository and configured to store data received by the storage system for backup, the deduplicated data being generated by deduplicating the data received by the storage system for backup;
   modifying, in response to the received request, the data stored in the at least one cache storage component and identified in the received request; and
   generating, in response to the received request, an indication that the deduplicated data stored in the repository corresponding to the data stored in the at least one cache storage component and identified in the received request was likewise modified in accordance with the received request,
   while preventing modification of the deduplicated data stored in the repository for a predetermined period of time.

2. The method according to claim 1, wherein the modifying includes at least one of the following: deletion of the data identified in the request, encryption of the data identified in the request, modification of the data identified in the request, and any combinations thereof.

3. The method according to claim 2, further comprising deleting, upon expiration of the predetermined period of time, the deduplicated data from the repository.

4. The method according to claim 2, further comprising receiving, prior to expiration of the predetermined period of time, a notification indicating that the received request to modify data stored in the storage system is a malicious request to modify data; and
   executing at least one of the following: preventing deduplication and storage of the modified data in the repository, and deleting modified data, that has been deduplicated from the repository, preventing deletion of the deduplicated data from the repository, and any combination thereof.

5. The method according to claim 2, wherein the repository is configured to store a copy of unmodified deduplicated data, identified in the received request, and the modified deduplicated data, as modified in response to the received request.

6. The method according to claim 2, further comprising maintaining a queue of a plurality of requests to modify data stored in the repository, wherein the maintained queue is organized based on respective predetermined time periods associated with each request in the plurality of requests.

7. The method according to claim 1, further comprising storing metadata identifying data stored in the repository.

8. The method according to claim 1, wherein the predetermined period of time is configurable.

9. The method according to claim 1, wherein a modification of the predetermined period of time is prohibited.

10. A system comprising:
    at least one programmable processor; and
    a non-transitory machine-readable medium storing instructions that, when executed by the at least one programmable processor, cause the at least one programmable processor to perform operations comprising:

receiving a request to modify data stored in a storage system, the storage system including a repository configured to store a deduplicated data and at least one cache storage component communicatively coupled to the repository and configured to store data received by the storage system for backup, the deduplicated data being generated by deduplicating the data received by the storage system for backup;

modifying, in response to the received request, the data stored in the at least one cache storage component and identified in the received request; and generating, in response to the received request, an indication that the deduplicated data stored in the repository corresponding to the data stored in the at least one cache storage component and identified in the received request was likewise modified in accordance with the received request, while preventing modification of the deduplicated data stored in the repository for a predetermined period of time.

11. The system according to claim 10, wherein the modifying includes at least one of the following: deletion of the data identified in the request, encryption of the data identified in the request, modification of the data identified in the request, and any combinations thereof.

12. The system according to claim 11, further comprising deleting, upon expiration of the predetermined period of time, the deduplicated data from the repository.

13. The system according to claim 11, wherein the operations further comprise receiving, prior to expiration of the predetermined period of time, a notification indicating that the received request to modify data stored in the storage system is a malicious request to modify data; and executing at least one of the following: preventing deduplication and storage of the modified data in the repository, and deleting modified data, that has been deduplicated from the repository, preventing deletion of the deduplicated data from the repository, and any combination thereof.

14. The system according to claim 11, wherein the repository is configured to store a copy of unmodified deduplicated data, identified in the received request, and the modified deduplicated data, as modified in response to the received request.

15. The system according to claim 11, wherein the operations further comprise maintaining a queue of a plurality of requests to modify data stored in the repository, wherein the maintained queue is organized based on respective predetermined time periods associated with each request in the plurality of requests.

16. The system according to claim 10, wherein the operations further comprise storing metadata identifying data stored in the repository.

17. The system according to claim 10, wherein the predetermined period of time is configurable.

18. The system according to claim 10, wherein a modification of the predetermined period of time is prohibited.

19. A computer program product comprising a non-transitory machine-readable medium storing instructions that, when executed by at least one programmable processor, cause the at least one programmable processor to perform operations comprising:

receiving a request to modify data stored in a storage system, the storage system including a repository configured to store a deduplicated data and at least one cache storage component communicatively coupled to the repository and configured to store data received by the storage system for backup, the deduplicated data being generated by deduplicating the data received by the storage system for backup;

modifying, in response to the received request, the data stored in the at least one cache storage component and identified in the received request; and generating, in response to the received request, an indication that the deduplicated data stored in the repository corresponding to the data stored in the at least one cache storage component and identified in the received request was likewise modified in accordance with the received request, while preventing modification of the deduplicated data stored in the repository for a predetermined period of time.

20. The computer program product according to claim 19, wherein the modifying includes at least one of the following: deletion of the data identified in the request, encryption of the data identified in the request, modification of the data identified in the request, and any combinations thereof.

21. The computer program product according to claim 20, wherein the operations further comprise deleting, upon expiration of the predetermined period of time, the deduplicated data from the repository.

22. The computer program product according to claim 20, wherein the operations further comprise receiving, prior to expiration of the predetermined period of time, a notification indicating that the received request to modify data stored in the storage system is a malicious request to modify data; and executing at least one of the following: preventing deduplication and storage of the modified data in the repository, and deleting modified data, that has been deduplicated from the repository, preventing deletion of the deduplicated data from the repository, and any combination thereof.

23. The computer program product according to claim 20, wherein the repository is configured to store a copy of unmodified deduplicated data, identified in the received request, and the modified deduplicated data, as modified in response to the received request.

24. The computer program product according to claim 20, wherein the operations further comprise maintaining a queue of a plurality of requests to modify data stored in the repository, wherein the maintained queue is organized based on respective predetermined time periods associated with each request in the plurality of requests.

25. The computer program product according to claim 19, wherein the operations further comprise storing metadata identifying data stored in the repository.

26. The computer program product according to claim 19, wherein the predetermined period of time is configurable.

27. The computer program product according to claim 19, wherein a modification of the predetermined period of time is prohibited.

\* \* \* \* \*